US011622118B2

(12) United States Patent
Holcomb et al.

(10) Patent No.: US 11,622,118 B2
(45) Date of Patent: Apr. 4, 2023

(54) DETERMINATION OF CODING MODES FOR VIDEO CONTENT USING ORDER OF POTENTIAL CODING MODES AND BLOCK CLASSIFICATION

(71) Applicant: Microsoft Technology Licensing, LLC, Redmond, WA (US)

(72) Inventors: Thomas W. Holcomb, Sammamish, WA (US); Jiahao Li, Beijing (CN); Bin Li, Beijing (CN); Yan Lu, Beijing (CN); Mei-Hsuan Lu, Taipei (TW); Andrey Mikhaylovic Mezentsev, Redmond, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/522,770

(22) Filed: Nov. 9, 2021

(65) Prior Publication Data
US 2022/0070470 A1    Mar. 3, 2022

Related U.S. Application Data

(63) Continuation of application No. 16/888,214, filed on May 29, 2020, now Pat. No. 11,190,774.

(51) Int. Cl.
*H04N 19/11* (2014.01)
*H04N 19/159* (2014.01)
*H04N 19/186* (2014.01)
*H04N 19/176* (2014.01)
*H04N 19/147* (2014.01)

(52) U.S. Cl.
CPC .......... *H04N 19/147* (2014.11); *H04N 19/11* (2014.11); *H04N 19/159* (2014.11); *H04N 19/176* (2014.11); *H04N 19/186* (2014.11)

(58) Field of Classification Search
CPC ............................. H04N 19/11; H04N 19/176
See application file for complete search history.

(56) References Cited

U.S. PATENT DOCUMENTS

| 2011/0007806 A1* | 1/2011 | Choi ............... H04N 19/176 375/240.16 |
| 2011/0142134 A1* | 6/2011 | Wahadaniah ......... H04N 7/52 375/E7.125 |
| 2018/0014011 A1* | 1/2018 | He .................. H04N 19/105 |

* cited by examiner

*Primary Examiner* — Jayanti K Patel
*Assistant Examiner* — Christopher Kingsbury Glover
(74) *Attorney, Agent, or Firm* — Klarquist Sparkman, LLP

(57) ABSTRACT

Techniques are described for efficiently encoding video data by skipping evaluation of certain encoding modes based on various evaluation criteria. In some solutions, intra-block evaluation is performed in a specific order during encoding, and depending on encoding cost calculations of potential intra-block encoding modes, evaluation of some of the potential encoding modes can be skipped. In some solutions, some encoding modes can be skipped depending on whether blocks are simple (e.g., simple vertical, simple horizontal, or both) or non-simple. In some solutions, various criteria are applied to determine whether chroma-from-luma mode evaluation can be skipped. The various solutions can be used independently and/or in combination.

20 Claims, 6 Drawing Sheets

DETERMINATION OF CODING MODES FOR VIDEO CONTENT USING ORDER OF POTENTIAL CODING MODES AND BLOCK CLASSIFICATION

CROSS REFERENCE TO RELATED APPLICATIONS

This application is a continuation of U.S. patent application Ser. No. 16/888,214, filed May 29, 2020, the disclosure of which is hereby incorporated by reference.

BACKGROUND

Encoding video content to produce a bitstream that is compliant with a given compression scheme involves making many decisions about which compression tools to evaluate with the goal of applying the most efficient options. For example, for some video content, deciding to code a frame using bidirectional prediction might produce a more efficient result (e.g., better fidelity at a lower bitrate) than forward prediction. For other content, forward prediction might be a better option. To determine which is better, the encoder needs to evaluate both options. Evaluating all possible options is generally not computation feasible so it is the goal of an encoder to make smart decisions about which possible modes to evaluate and which can be skipped due to low probability that they will give the optimum result.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are applied to more efficiently encode video data by skipping evaluation of certain encoding modes based on various evaluation criteria. In some solutions, intra-block evaluation is performed in a specific order during encoding, and depending on encoding cost calculations of potential intra-block encoding modes, evaluation of some of the potential modes can be skipped. In some solutions, some encoding modes can be skipped depending on whether blocks are simple (e.g., simple vertical, simple horizontal, or both) or non-simple. In some solutions, various criteria are applied to determine whether chroma-from-luma mode evaluation can be skipped. The various solutions can be used independently and/or in combination.

For example, some of the technologies comprise receiving a frame of video data to be encoded, and for each block of a plurality of blocks of the frame, determining an encoding mode for the block. Determining the encoding mode can comprise performing intra-block evaluation of a plurality of potential encoding modes for the block in an evaluation order as follows: a) intra-block copy mode, b) palette mode, and c) directional spatial prediction mode. Determining the encoding mode can further comprise evaluating costs of encoding the block in the potential encoding modes in the evaluation order. When a cost of a potential encoding mode is less than a threshold, evaluation of subsequent potential encoding modes in the evaluation order can be skipped, and the potential encoding mode (the current potential encoding mode being evaluated) can be determined as the encoding mode for encoding the block. The block can then be encoded using the determined encoding mode.

As described herein, a variety of other features and advantages can be incorporated into the technologies as desired.

DETAILED DESCRIPTION

Overview

Figure 1:
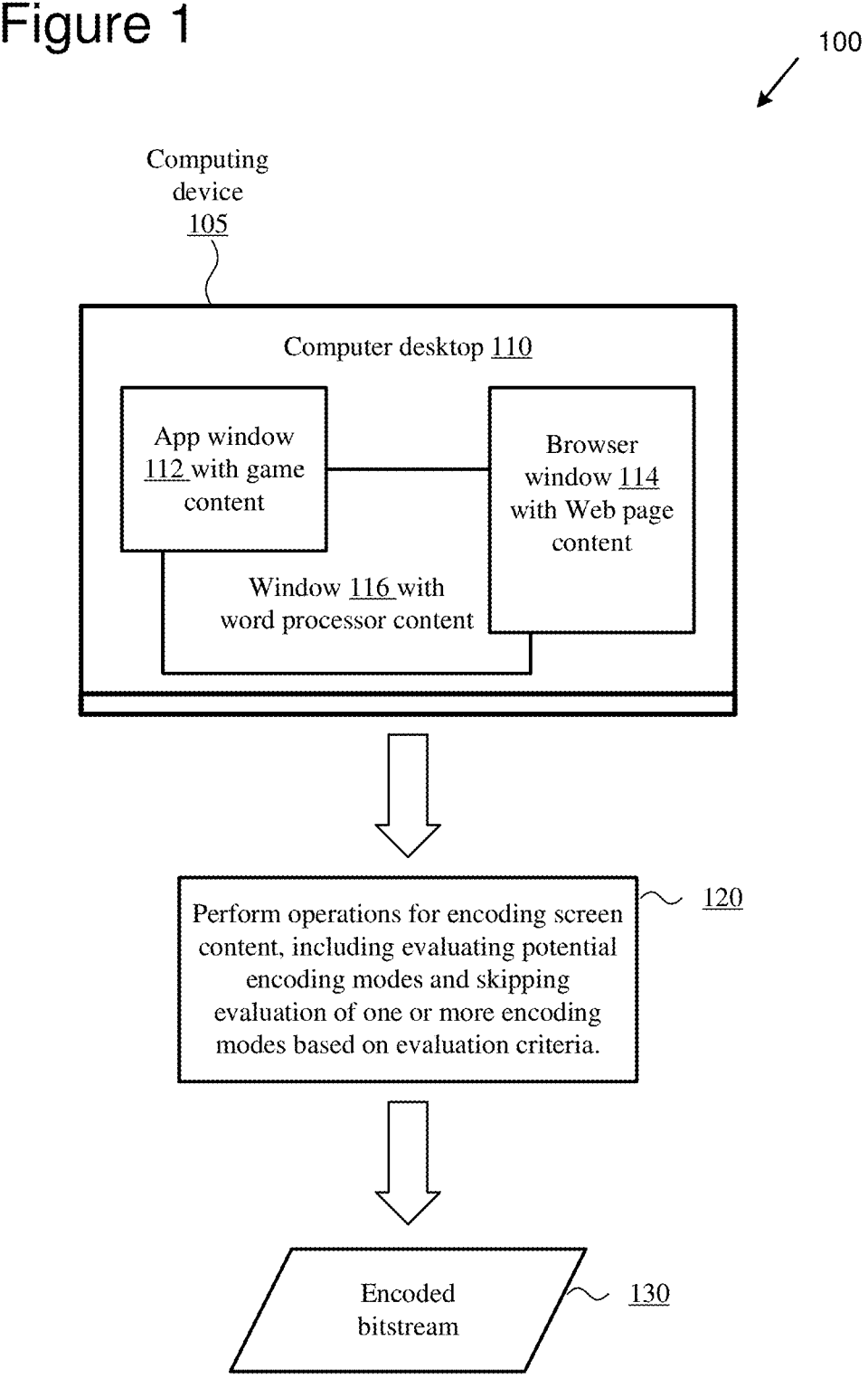
FIG. 1 is diagram illustrating a computer desktop environment with content that may provide input for screen capture.

As described herein, technologies can be applied to more efficiently encode video data by skipping evaluation of certain encoding modes based on various criteria. In some solutions, intra-block evaluation is performed in a specific order during encoding, and depending on encoding cost calculations of potential intra-block encoding modes, evaluation of some of the potential modes can be skipped. In some solutions, some encoding modes can be skipped depending on whether blocks are simple (e.g., simple vertical, simple horizontal, or both) or non-simple. In some solutions, various criteria are applied to determine whether chroma-from-luma mode evaluation can be skipped. The various solutions can be used independently and/or in combination.

In general, a video frame is divided into a number of portions, which are generally referred to as blocks. A video frame could be divided into blocks of the same size (e.g., 8×8 blocks or 4×4 blocks) or different parts of the video frame could be divided into blocks of different sizes. For example, a part of the video frame could be divided into blocks of 8×8 pixels while another part of the video frame could be divided into blocks of 32×32 pixels. As used herein, the term "block" is used as a general term to refer to any size portion of pixels or samples of a video frame for which an encoding mode can be selected (e.g., the term "block" can also indicate a macroblock, prediction unit, residual data unit, coding block, etc.). The video encoder selects between a number of available encoding modes when encoding the blocks of a given video frame.

For example, the technologies described herein can be implemented by a video encoder (e.g., video encoding software running on a computing device). The video encoder can receive video data to be encoded (e.g., from a file, from a video capture device, from a computer desktop or application window, or from another source of real-world or computer-generated video data). The video encoder can perform operations to encode the video data (e.g., to encode each of a sequence of video frames).

In some implementations, the video encoder determines an encoding mode for each of a plurality of blocks of a video frame by performing various evaluations. For example, the video encoder performs intra-block evaluation of a plurality of potential encoding modes for the block in the following order: a) intra-block copy mode, b) palette mode, and c) directional spatial prediction mode. The video encoder evaluates the cost of encoding the block in each of the potential encoding modes in order. When the cost of a potential encoding mode is less than a corresponding threshold value of the potential encoding mode, then the encoder selects the potential encoding mode for encoding the block and skips the evaluation of the remaining potential encoding modes in the sequence. Other implementations can us a different order for evaluating the potential encoding modes and/or can include additional or different potential encoding modes (e.g., potential encoding modes in addition to those in this example implementation).

By evaluating potential encoding modes (e.g., using evaluation criteria), improvements in video encoding can be realized. For example, if a video encoder evaluates a potential encoding mode and determines that the video data (e.g., a current block) can be encoded efficiently (e.g., optimally), then the video encoder can skip evaluation of additional potential encoding modes. The video encoder can also use other types of evaluation criteria to make more efficient encoding decisions. For example, the encoder can classify blocks (e.g. classify the blocks as simple horizontal, simple vertical, simple, and non-simple) and make encoding decisions (e.g., skipping evaluation of certain potential encoding modes) based at least in part on the classification. Therefore, the video encoder can save the computing resources that would have otherwise be needed to evaluate the additional potential encoding modes for the video data. This process can also result in reduced latency and leave computing resources free for other encoding tasks (e.g., performing other encoding tasks that result in increased compression and/or increased quality).

In some implementations, the order for evaluating the potential encoding modes for performing intra-block evaluation is chosen based on the type of video data being encoded. For example, if the type of video data being encoded is screen content (computer-generated content that can be displayed on a computer screen, such as computer graphics displayed on a computer desktop and/or computer-generated content displayed in an application window or computer game), then the first potential encoding mode in the order to be evaluated can be intra-block copy mode. The intra-block copy mode can be evaluated first in the order because it is often the most efficient when encoding screen content (e.g., for desktop content, many areas of a computer desktop or application window may have the same content, such as areas with a solid color such as white or grey, or areas containing the same letter). As computer-generated video content that is artificially created, screen content tends to have relatively few discrete sample values, compared to natural video content that is captured using a video camera. For example, a region of screen capture content often includes a single uniform color, whereas a region in natural video content more likely includes colors that gradually vary. Also, screen capture content typically includes distinct structures (e.g., graphics, text characters) that are exactly repeated from frame-to-frame, even if the content may be spatially displaced (e.g., due to scrolling). Screen capture content is usually encoded in a format with lower chroma sampling resolution (e.g., YUV 4:2:0), although it may also be encoded in a format with higher chroma sampling resolution (e.g., YUV 4:4:4).

The technologies described herein allow the video encoder to make smarter decisions about the possible encoding modes to evaluate so that a more efficient mode is chosen (e.g., a mode that is more efficient than other modes, or an optimal mode) in a computationally efficient manner. This allows the encoder to compress video within a real-time processing constraint (e.g., for use with a real-time video communication application).

The technologies described herein can be implemented by various video encoding technologies. For example, the technologies can be implemented by an AV1 video encoder, by an H.264 video encoder, by an HEVC video encoder, by a Versatile Video Coding (VVC) video encoder, and/or by a video encoder operating according to another video coding standard. AOMedia Video 1 (AV1) is video codec and associated video coding specification provided by the Alliance for Open Media (AOMedia; https://aomedia.org)

Intra Block Evaluation

In the technologies described herein, intra block evaluation can be performed during video encoding. For example, a portion of video content (e.g., a block) can be encoded by evaluating a number of potential encoding modes in a particular order, and if one of the potential encoding modes would produce acceptable results (e.g., would satisfy a cost criterial), then the portion of video content can be encoded using that mode and evaluation of the remaining modes can be skipped.

In some implementations, intra block evaluation is performed by evaluating the following plurality of potential encoding modes in the following order: a) intra-block copy mode, b) palette mode, and c) directional spatial prediction mode. If intra-block copy mode would produce acceptable results (if the cost of encoding a block in the intra-block copy mode is less than a threshold for the intra-block copy mode), then the block is encoded using the intra-block copy mode and evaluation of the subsequent potential encoding modes in the order are skipped (i.e., evaluation of palette mode and directional spatial prediction mode are skipped). If intra-block copy mode would not produce acceptable results (e.g., if the cost is not less than the corresponding threshold), then evaluation proceeds to palette mode. If palette mode would produce acceptable results (if the cost of encoding the block in the palette mode is less than a threshold for the palette mode), then the block is encoded using the palette mode and evaluation of the subsequent potential encoding modes in the order are skipped (i.e., evaluation of directional spatial prediction mode are skipped). If palette mode would not produce acceptable results (e.g., if the cost is not less than the corresponding threshold), then directional spatial prediction mode is selected as it is the last potential mode in the order.

When evaluating the cost of encoding a portion of video data (e.g., a block or other area of a frame) various criteria can be used. For example, the cost can be calculated by checking the prediction quality (e.g., the difference of a current block compared with a reference block). The cost can also be calculated based on the bits needed to encode the block and the distortion. The cost can also be calculated just based on the distortion. Combinations of these criteria can be used, separately or in combination with other criteria.

In a particular implementation, the cost and distortion are stored for all the previous encoded blocks in the current frame. Evaluation of the potential encoding modes can be terminated early (i.e., evaluation of subsequent potential encoding modes can be skipped) in the following situations:

a) After performing block vector search of intra block copy, if the current prediction cost (motion estimation cost) is larger than the (5/4)*average value, then the residue determination and coding process are terminated.

b) Early termination on further splitting. When the current cost is smaller than a threshold, further splitting of the current block is not evaluated. The threshold is calculated based on the average of the rate-distortion (RD) costs of the previous coded blocks for which the non-splitting cost is smaller than the splitting cost. If the block is equal to 8×8, the threshold is set as the average number. For other block sizes, the threshold is set to 0.8*the average cost. When there are not enough blocks to calculate the average, the threshold is set to a very small number (e.g., 0), such that no early termination happens.

The above threshold calculations are used for this particular implementation, and different implementations can use different calculations for the threshold.

Block Classification

In the technologies described herein, blocks can be classified based on their content (e.g., on their pixel values). In some implementations, blocks are classified using at least the following four categories. The first category is simple vertical in which each column of a block has the same pixel value, although the pixel values can be different form column to column. The second category is simple horizontal in which each row of a block has the same pixel value, although the pixel values can be different form row to row. The third category is simple in which the pixel values of the entire block are the same (e.g., the block could be a solid white block, a solid black block, or a block of the same color). A simple block can also be considered as both simple vertical and simple horizontal. The fourth category is non-simple and applies to blocks that are not classified into one of the first three categories.

Depending on the classification of a block, evaluation of certain encoding modes can be skipped based on evaluation criteria. This provides advantages in terms of computing resources. For example, skipping evaluation of encoding modes saves computing resources (e.g., processor and memory) that would otherwise be needed to evaluate these modes.

In a first aspect of block classification (a first example evaluation criteria), if a block is classified as simple vertical, then evaluation of the horizontal spatial prediction mode can be skipped. If the block is a simple vertical block, then the horizontal spatial prediction mode will likely not be an efficient mode for encoding the block. In some implementations, this aspect of block classification is performed during intra block evaluation of the directional spatial prediction mode. Specifically, if the block is classified as simple vertical, then during evaluation of the directional spatial prediction mode, evaluation of the horizontal spatial prediction mode (one type of the directional spatial prediction mode) can be skipped.

In a second aspect of block classification (a second example evaluation criteria), if a block is classified as simple horizontal, then evaluation of the vertical spatial prediction mode can be skipped. If the block is a simple horizontal block, then the vertical spatial prediction mode will likely not be an efficient mode for encoding the block. In some implementations, this aspect of block classification is performed during intra block evaluation of the directional spatial prediction modes. Specifically, if the block is classified as simple horizontal, then during evaluation of the directional spatial prediction mode, evaluation of the vertical spatial prediction mode (one type of the directional spatial prediction mode) can be skipped.

In a third aspect of block classification (a third example evaluation criteria), if a block is classified as simple, then evaluation of smaller sub-block partitions can be skipped. In this situation, the block can be encoded at its current size. In some implementations, this aspect of block classification is performed when deciding whether to perform block splitting (e.g., splitting a block of a given size into four sub blocks, which can be done recursively down to a minimum sub block size). For example, intra block evaluation of sub blocks (e.g., evaluating encoding modes such as intra block copy mode, palette mode, and directional spatial prediction modes) can be skipped when the block is simple.

In a fourth aspect of block classification (a fourth example evaluation criteria), if a block is classified as simple vertical, simple horizontal, or simple, then evaluation of intra block copy mode can be reduced or eliminated. In some implementations, this aspect of block classification is performed during intra block evaluation. Specifically, if the block is classified as simple vertical, simple horizontal, or simple, then evaluation of the intra block copy mode can be skipped entirely or the intra block copy mode can be performed in part (e.g., without doing any searching, such as hash-based block matching).

In a fifth aspect of block classification (a fifth example evaluation criteria), if a block is classified as simple vertical, simple horizontal, or simple, then evaluation of palette mode can be skipped. For example, evaluation of palette mode is expensive and may not improve encoding results for such blocks. In some implementations, this aspect of block classification is performed during intra block evaluation. Specifically, if the block is classified as simple vertical, simple horizontal, or simple, then evaluation of the palette mode can be skipped.

In a sixth aspect of block classification (a sixth example evaluation criteria), if a block is classified as simple, then evaluation of the chroma-from-luma (CfL) mode can be skipped.

Evaluation of Chroma-from-Luma Mode

In the technologies described herein, the evaluation of the chroma-from-luma (CfL) mode can be skipped in certain situations. For example, when encoding chroma blocks, these techniques can be applied to skip evaluation of the CfL mode. In general, evaluation of the CfL mode can be skipped based on comparison of cost (the bit cost for encoding, also referred to as the rate) and/or distortion (quality of encoded video) measures.

Skipping evaluation of the CfL mode can provide advantages in terms of computing resources. For example, skipping evaluation of the CfL mode saves computing resources (e.g., processor and memory) that would otherwise be needed to evaluate this mode.

In a first aspect of CfL evaluation, if the distortion of the DC prediction mode is less than a corresponding threshold value, then evaluation of the CfL mode is skipped. In some implementations, this threshold is a function of the quantization parameter (e.g., q_index) used for the block. For example, the distortion threshold can be defined as: block_width*block_height*q_index/4.

In a second aspect of CfL evaluation, if the cost of the DC prediction mode is less than a corresponding threshold value, then evaluation of the CfL mode is skipped. In some implementations, this threshold is a function of the quantization parameter (e.g., q_index) used for the block. For example, the cost threshold can be defined as: block_width*block_height*q_index*64.

Example Encoding of Screen Content

The technologies described herein for more efficiently encoding video data by skipping evaluation of certain encoding modes based on various criteria can be applied when encoding any type of video data. In particular, however, these technologies can improve performance when encoding certain artificially-created video content such as screen content (also referred to as screen capture content).

In general, screen content represents the output of a computer screen or other display. FIG. 1 is diagram illustrating a computer desktop environment of a computing device 105 (e.g., a laptop or notebook computer, a desktop computer, a tablet, a smart phone, or another type of computing device) with screen content that may be encoded using the technologies described herein. For example, video data that comprises screen content represent a series of images (frames) of the entire computer desktop 110. Or, video data that comprises screen content can represent a series of images for one of the windows of the computer desktop environment, such as app window 112 (e.g., which can include game content), browser window 114 (e.g., which can include web page content), and/or window 116 (e.g., which can include application content, such as word processor content).

As depicted at 120, operations are performed for encoding the screen content (e.g., a sequence of images of the computer desktop 110 and/or portions of the computer desktop 110, such as a specific application window or windows). The operations include evaluating potential encoding modes and skipping evaluation of one or more of the potential encoding modes based on evaluation criteria. For example, intra-block evaluation can be performed when determining encoding modes for blocks of the screen content frames. Intra-block evaluation can comprise evaluating a plurality of potential encoding modes in an evaluation order. Based on the cost of encoding a given block, evaluation of subsequent potential encoding modes in the encoding order can be skipped. Evaluation of encoding modes can also be skipped based on block classification (e.g., whether the block is simple vertical, simple vertical, simple, or non-simple). Evaluation of the CfL model can also be skipped based on evaluation of certain criteria.

As depicted at 130, the result of the encoding process is an encoded bitstream. The encoded bitstream can be stored or provided to another device (e.g., streamed to a receiving device via a network). For example, the encoded bitstream can be streamed to another device as part of a real-time streaming video solution that includes sharing screen content.

Methods for Evaluating Encoding Modes for Encoding Video Content

In any of the examples herein, methods can be provided for evaluating encoding modes for encoding video content. In some implementations, the video content comprises screen content.

Figure 2:
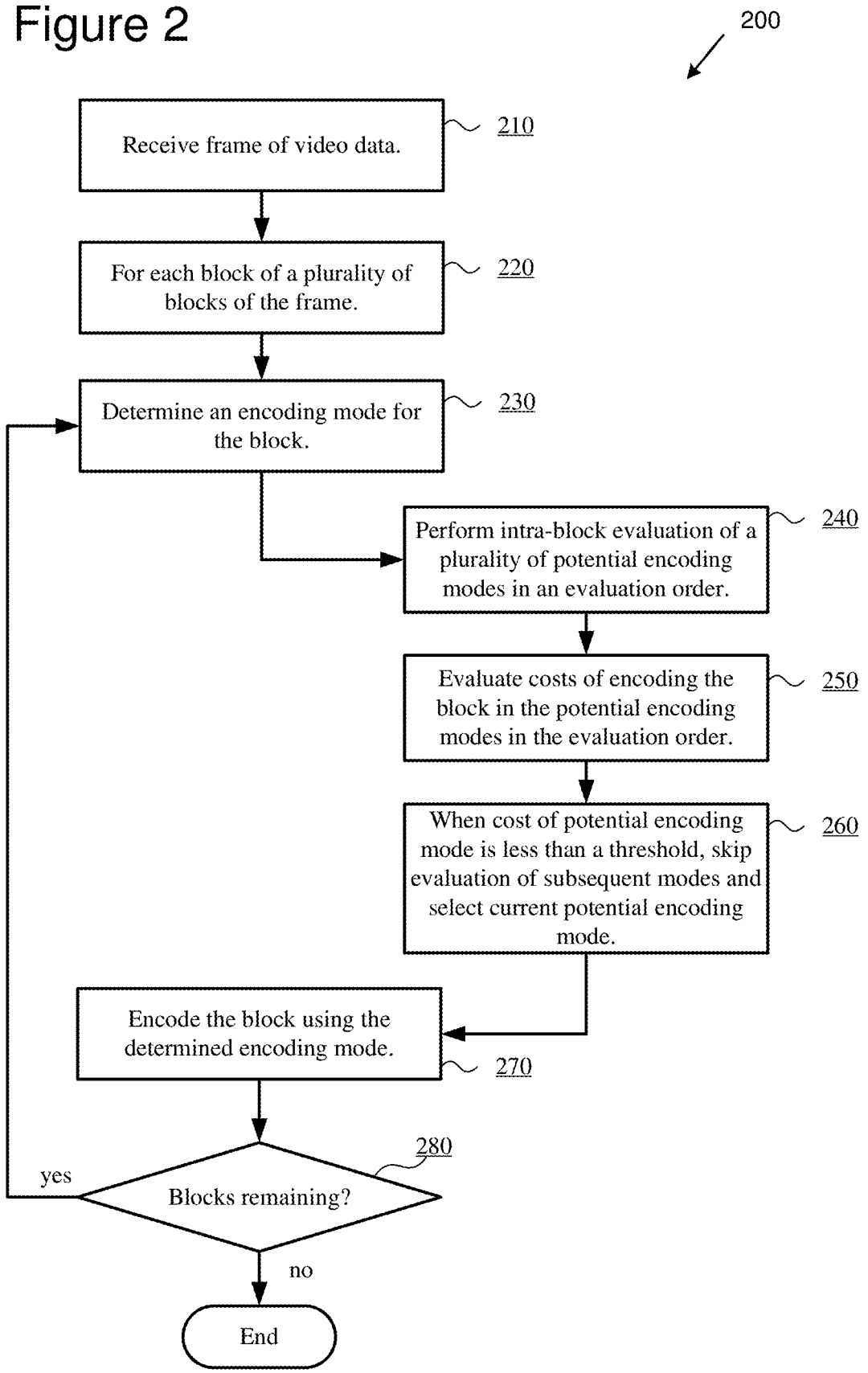
FIG. 2 is a flowchart of an example method for evaluating encoding modes for encoding video content, including performing intra-block evaluation.

FIG. 2 is a flowchart of an example method 200 for evaluating encoding modes for encoding video content (e.g., comprising screen content). For example, the example method 200 can be performed by a video encoder running on software and/or hardware resources of a computing device. The video encoder can be implemented according to a video coding standard (e.g., according to the AV1 video coding standard or another video coding standard).

At 210, a frame of video data is received. For example, the frame of video data can be received as an image of screen content. The frame of video data can be received by a video encoder (e.g., by an AV1 video encoder).

At 220, a number of operations are performed for each block of a plurality of blocks of the frame. For example, the frame can be divided into various blocks of various sizes (e.g., 64×64 blocks, 32×32 blocks, and/or blocks of different sizes). Some or all of the blocks of the frame can then be encoded using these operations.

At 230, an encoding mode is determined for the block. Determining the encoding mode for the block involves performing the operations depicted at 240 through 260. At 240, intra-block evaluation is performed for a plurality of potential encoding modes for the block in an evaluation order. In some implementations, the potential encoding modes comprise an intra-block copy mode, a palette mode, and a directional spatial prediction mode, in that order. Other implementations can use a different collection of potential encoding modes in a different evaluation order.

At 250, the costs of encoding the block in the potential encoding modes are evaluated in the evaluation order. Specifically, each potential encoding mode is evaluated in the evaluation order. At 260, when the cost of a potential encoding mode is less than a threshold for the potential encoding mode, evaluation of the subsequent potential encoding modes in the evaluation order are skipped and the current potential encoding mode is selected for encoding the block. For example, the cost of encoding the block in the intra-block copy mode is evaluated first because it is first in the evaluation order. If the cost is less than a threshold for the intra-block copy mode, then evaluation of the subsequent potential encoding modes (in this example, the palette mode and the directional spatial prediction mode) is skipped and the intra-block copy mode is selected for encoding the block. However, if the cost is not less than the threshold for the intra-block copy mode, then evaluation proceeds to the palette mode because it is second in the evaluation order. If the cost of encoding the block in the palette mode is less than a threshold for the palette mode, then evaluation of the subsequent potential encoding modes (in this example the directional spatial prediction mode) is skipped in the palette mode is selected for encoding the block. However, if the cost is not less than the threshold for the palette mode, then the directional spatial prediction mode is selected for encoding the block as it is the final mode in the evaluation order.

At 270, the block is encoded using the determined encoding mode. For example, the block can be encoded according to the determined encoding mode as it is implemented in the video coding specification being used (e.g., encoded according to the AV1 video coding specification).

At 280, if there are any remaining blocks to be encoded, then the process proceeds back to 230 to encode the next block. If there are no more blocks remaining to encode, then the process ends. However, additional encoding operations can still be performed (e.g., encoding of additional frames of video data can be carried out).

Figure 3:
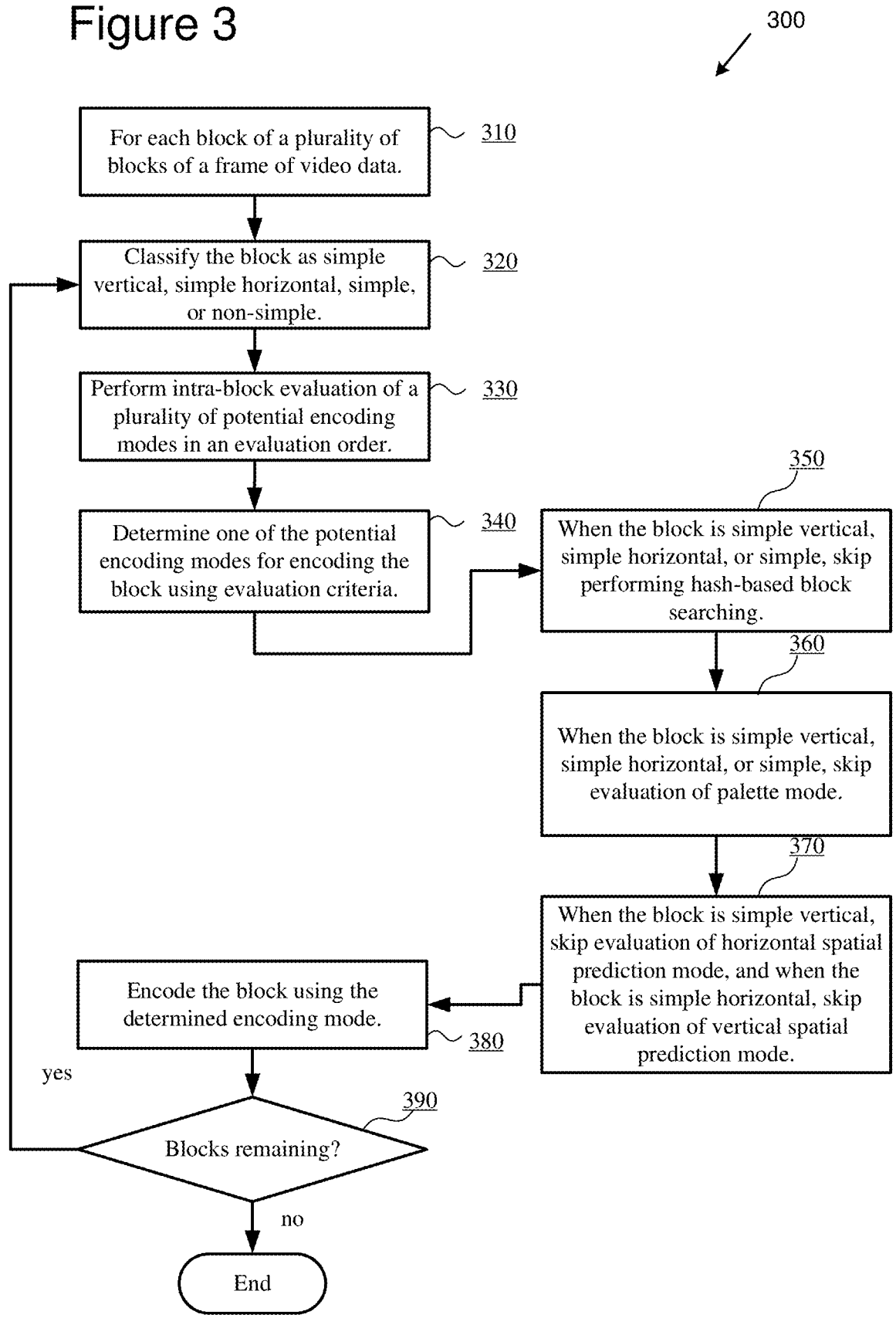
FIG. 3 is a flowchart of an example method for evaluating encoding modes for encoding video content, including performing block classification.

FIG. 3 is a flowchart of an example method 300 for evaluating encoding modes for encoding video content (e.g., comprising screen content), including performing block classification. For example, the example method 300 can be performed by a video encoder running on software and/or hardware resources of a computing device. The video encoder can be implemented according to a video coding standard (e.g., according to the AV1 video coding standard or another video coding standard).

At 310, a number of operations are performed for each block of a plurality of blocks of the frame. For example, the frame can be divided into various blocks of various sizes (e.g., 64×64 blocks, 32×32 blocks, and/or blocks of different sizes). Some or all of the blocks of the frame can then be encoded using these operations.

At 320, the block is classified, which comprises evaluating the following four categories and determining one of the four categories for the block: simple vertical, simple horizontal, simple, and non-simple.

At 330, intra-block evaluation is performed for a plurality of potential encoding modes for the block in an evaluation order. In some implementations, the potential encoding modes comprise an intra-block copy mode, a palette mode, and a directional spatial prediction mode, in that order. Other implementations can use a different collection of potential encoding modes in a different evaluation order.

At 340, one of the potential encoding modes is determined for encoding the block based on evaluation criteria. In some implementations, the evaluation criteria comprise the criteria at 350 through 370. In other implementations, other evaluation criteria can be considered (e.g., in addition to the depicted evaluation criteria).

At 350, when the block is classified as simple vertical, simple horizontal, or simple, performing at least hash-based block searching during evaluation of the intra-block copy mode is skipped. In some implementations, evaluation of the entire intra-block copy mode is skipped if this evaluation criteria is satisfied.

At 360, when the block is classified as simple vertical, simple horizontal, or simple, evaluation of the palette mode is skipped.

At 370, certain modes within the directional spatial prediction mode can be skipped. Specifically, when the block is classified as simple vertical, evaluation of a horizontal spatial prediction mode is skipped. When the block is classified as simple horizontal, evaluation of a vertical spatial prediction mode is skipped.

At 380, the block is encoded using the determined encoding mode. For example, the block can be encoded according to the determined encoding mode as it is implemented in the video coding specification being used (e.g., encoded according to the AV1 video coding specification).

At 390, if there are any remaining blocks to be encoded, then the process proceeds back to 320 to encode the next block. If there are no more blocks remaining to encode, then the process ends. However, additional encoding operations can still be performed (e.g., encoding of additional frames of video data can be carried out).

Figure 4:
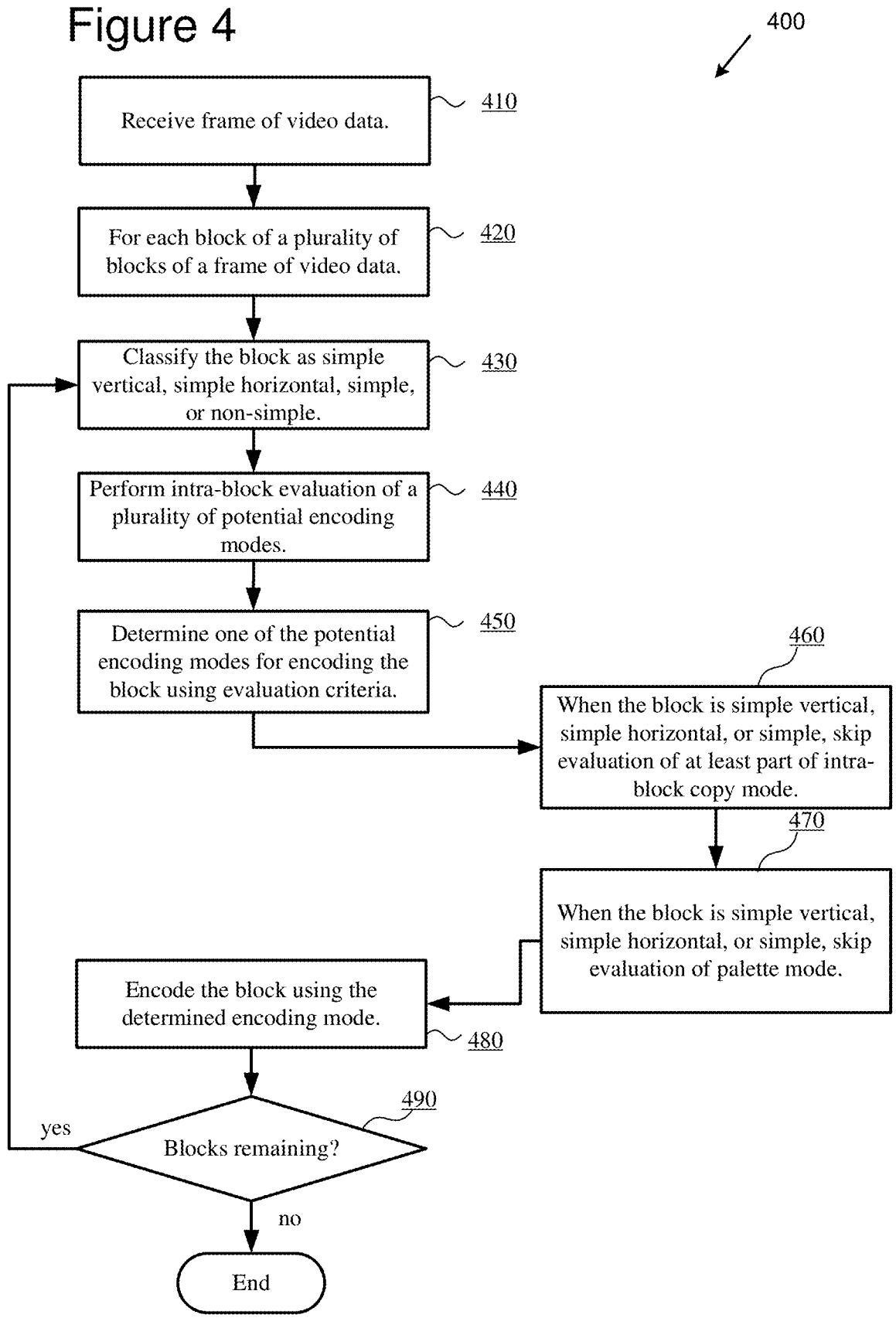
FIG. 4 is a flowchart of an example method for evaluating encoding modes for encoding video content, including performing block classification.

FIG. 4 is a flowchart of an example method 400 for evaluating encoding modes for encoding video content (e.g., comprising screen content), including performing block classification. For example, the example method 400 can be performed by a video encoder running on software and/or hardware resources of a computing device. The video encoder can be implemented according to a video coding standard (e.g., according to the AV1 video coding standard or another video coding standard).

At 410, a frame of video data is received. For example, the frame of video data can be received as an image of screen content. The frame of video data can be received by a video encoder (e.g., by an AV1 video encoder).

At 420, a number of operations are performed for each block of a plurality of blocks of the frame. For example, the frame can be divided into various blocks of various sizes (e.g., 64×64 blocks, 32×32 blocks, and/or blocks of different sizes). Some or all of the blocks of the frame can then be encoded using these operations.

At 430, the block is classified, which comprises evaluating the following four categories and determining one of the four categories for the block: simple vertical, simple horizontal, simple, and non-simple.

At 440, intra-block evaluation is performed for a plurality of potential encoding modes for the block. In some implementations, the potential encoding modes comprise an intra-block copy mode, a palette mode, and a directional spatial prediction mode, in that order. Other implementations can use a different collection of potential encoding modes in a different evaluation order. In some implementations, the evaluation of the plurality of potential encoding modes is performed in an evaluation order.

At 450, one of the potential encoding modes is determined for encoding the block based on evaluation criteria. In some implementations, the evaluation criteria comprise the criteria at 460 and 470. In other implementations, other evaluation criteria can be considered (e.g., in addition to the depicted evaluation criteria).

At 460, when the block is classified as simple vertical, simple horizontal, or simple, evaluation of at least part of the intra-block copy mode is skipped if this criteria is satisfied. For example, hash-based block searching can be skipped, or evaluation of the entire intra-block copy mode can be skipped.

At 470, when the block is classified as simple vertical, simple horizontal, or simple, evaluation of the palette mode is skipped.

At 480, the block is encoded using the determined encoding mode. For example, the block can be encoded according to the determined encoding mode as it is implemented in the video coding specification being used (e.g., encoded according to the AV1 video coding specification).

At 490, if there are any remaining blocks to be encoded, then the process proceeds back to 430 to encode the next block. If there are no more blocks remaining to encode, then the process ends. However, additional encoding operations can still be performed (e.g., encoding of additional frames of video data can be carried out).

Computing Systems

Figure 5:
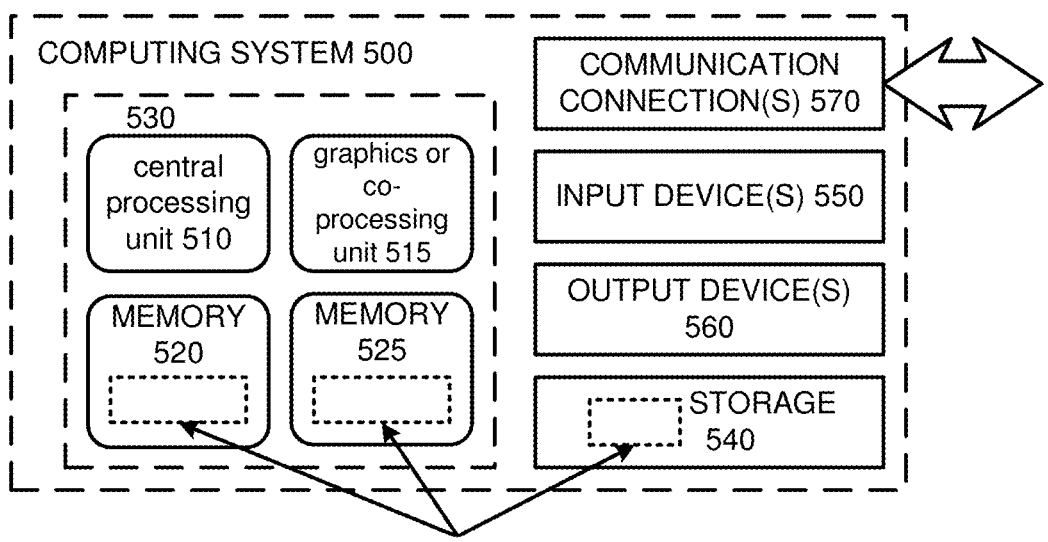
FIG. 5 is a diagram of an example computing system in which some described embodiments can be implemented.

FIG. 5 depicts a generalized example of a suitable computing system 500 in which the described technologies may be implemented. The computing system 500 is not intended to suggest any limitation as to scope of use or functionality, as the technologies may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more technologies described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information and which can be accessed within the computing system 500. The storage 540 stores instructions for the software 580 implementing one or more technologies described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud-Supported Environment

Figure 6:
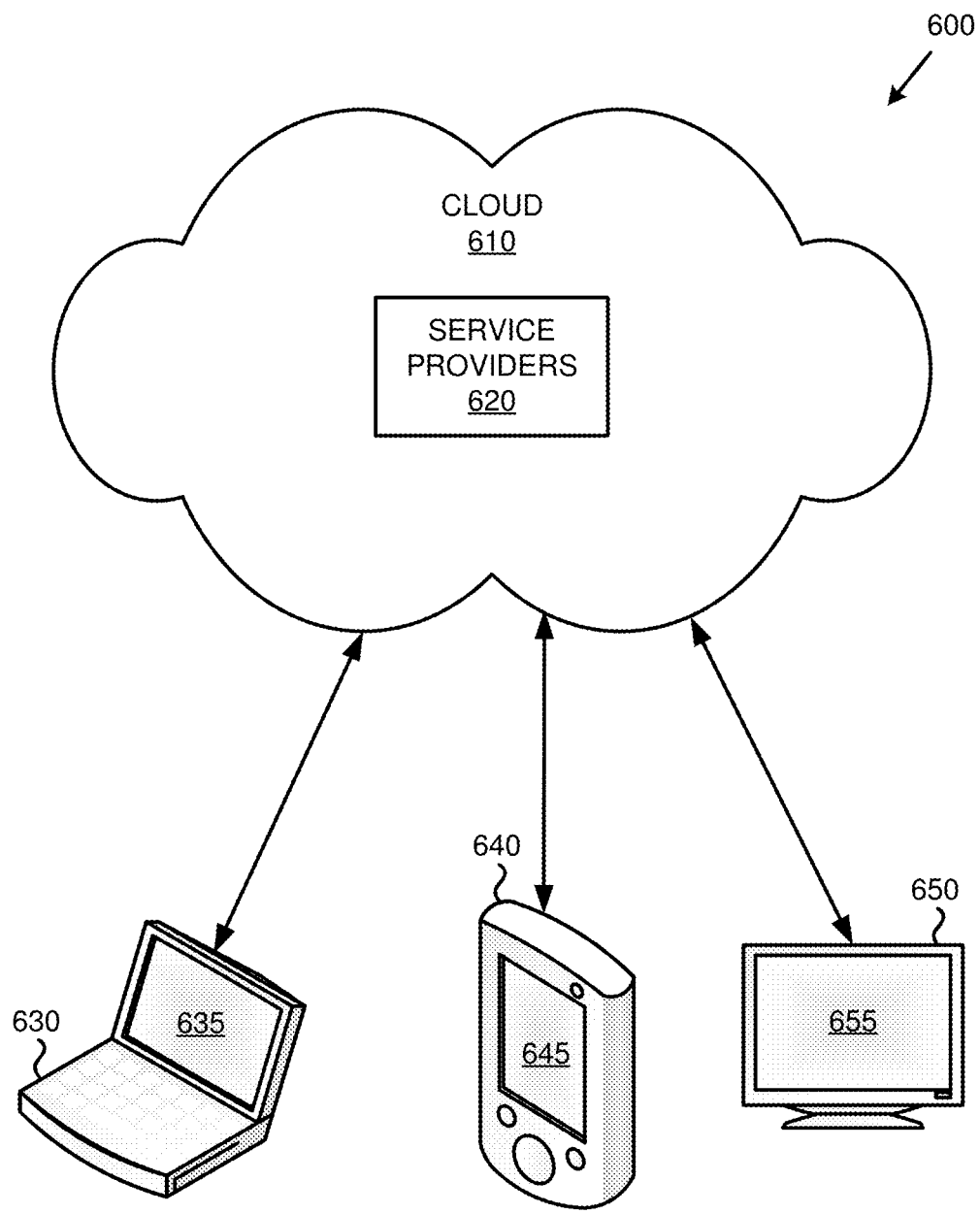
FIG. 6 is an example cloud-support environment that can be used in conjunction with the technologies described herein.

FIG. 6 illustrates a generalized example of a suitable cloud-supported environment 600 in which described embodiments, techniques, and technologies may be implemented. In the example environment 600, various types of services (e.g., computing services) are provided by a cloud 610. For example, the cloud 610 can comprise a collection of computing devices, which may be located centrally or distributed, that provide cloud-based services to various types of users and devices connected via a network such as the Internet. The implementation environment 600 can be used in different ways to accomplish computing tasks. For example, some tasks (e.g., processing user input and presenting a user interface) can be performed on local computing devices (e.g., connected devices 630, 640, 650) while other tasks (e.g., storage of data to be used in subsequent processing) can be performed in the cloud 610.

In example environment 600, the cloud 610 provides services for connected devices 630, 640, 650 with a variety of screen capabilities. Connected device 630 represents a device with a computer screen 635 (e.g., a mid-size screen). For example, connected device 630 could be a personal computer such as desktop computer, laptop, notebook, netbook, or the like. Connected device 640 represents a device with a mobile device screen 645 (e.g., a small size screen). For example, connected device 640 could be a mobile phone, smart phone, personal digital assistant, tablet computer, and the like. Connected device 650 represents a device with a large screen 655. For example, connected device 650 could be a television screen (e.g., a smart television) or another device connected to a television (e.g., a set-top box or gaming console) or the like. One or more of the connected devices 630, 640, 650 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 600. For example, the cloud 610 can provide services for one or more computers (e.g., server computers) without displays.

Services can be provided by the cloud 610 through service providers 620, or through other providers of online services (not depicted). For example, cloud services can be customized to the screen size, display capability, and/or touchscreen capability of a particular connected device (e.g., connected devices 630, 640, 650).

In example environment 600, the cloud 610 provides the technologies and solutions described herein to the various connected devices 630, 640, 650 using, at least in part, the service providers 620. For example, the service providers 620 can provide a centralized solution for various cloud-based services. The service providers 620 can manage service subscriptions for users and/or devices (e.g., for the connected devices 630, 640, 650 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A method, implemented by a computing device, for determining coding modes for video content, the method comprising, for each block of multiple blocks of a frame of the video content:
    determining an order of multiple potential coding modes for the block, the multiple potential coding modes comprising intra-block copy mode, palette mode, and directional spatial prediction mode; and
    determining a coding mode for the block, the block having a block classification selected from multiple categories, the multiple categories comprising simple vertical, simple horizontal, simple, and non-simple, wherein the simple vertical category indicates, for each column of the block, all pixel values in that column are identical, wherein the simple horizontal category indicates, for each row of the block, all pixel values in that row are identical, wherein the simple category indicates all pixel values of the block are identical, and wherein:
        the intra-block copy mode is not used when the block classification of the block is simple vertical, simple horizontal, or simple; and
        the palette mode is not used when the block classification of the block is simple vertical, simple horizontal, or simple.

2. The method of claim 1, wherein the determining the coding mode for the block includes evaluating costs of encoding the block in the multiple potential coding modes in the order, and wherein the evaluating the costs comprises, when a cost of a given coding mode of the multiple potential coding modes is less than a threshold:
    skipping evaluation of a subsequent potential coding mode, among the multiple potential coding modes, in the order; and
    selecting the given coding mode as the determined coding mode for the block.

3. The method of claim 2, wherein the evaluating the costs comprises, during evaluation of the intra-block copy mode, when the cost of encoding the block in the intra-block copy mode is less than the threshold for the intra-block copy mode:
    skipping evaluation of both the palette mode and the directional spatial prediction mode; and
    selecting the intra-block copy mode as the determined coding mode for the block.

4. The method of claim 2, wherein the evaluating the costs comprises, during evaluation of the palette mode, when the cost of encoding the block in the palette mode is less than the threshold for the palette mode:
    skipping evaluation of the directional spatial prediction mode; and
    selecting the palette mode as the determined coding mode for the block.

5. The method of claim 1, wherein the determining the coding mode for the block further includes, when evaluating the directional spatial prediction mode for the block:
- when the block classification of the block is simple vertical, skipping evaluation of a horizontal spatial prediction mode; and
- when the block classification of the block is simple horizontal, skipping evaluation of a vertical spatial prediction mode.

6. The method of claim 1, wherein the determining the coding mode for the block further includes, when evaluating the directional spatial prediction mode for the block:
- when the block classification of the block is simple, skipping evaluation of a chroma-from-luma mode.

7. The method of claim 1, wherein the video content is screen content.

8. The method of claim 1, wherein the frame of video content is encoded according to the AV1 video coding specification.

9. The method of claim 1, further comprising:
- outputting, as part of a bitstream, encoded data for the multiple blocks of the frame.

10. One or more non-transitory computer-readable media having stored thereon computer-executable instructions for causing one or more processors, when programmed thereby, to perform operations to determine coding modes for video content, the operations comprising, for each block of multiple blocks of a frame of the video content:
- determining an order of multiple potential coding modes for the block, the multiple potential coding modes comprising intra-block copy mode, palette mode, and directional spatial prediction mode; and
- determining a coding mode for the block, the block having a block classification selected from multiple categories, the multiple categories comprising simple vertical, simple horizontal, simple, and non-simple, wherein the simple vertical category indicates, for each column of the block, all pixel values in that column are identical, wherein the simple horizontal category indicates, for each row of the block, all pixel values in that row are identical, wherein the simple category indicates all pixel values of the block are identical, and wherein:
  - the intra-block copy mode is not used when the block classification of the block is simple vertical, simple horizontal, or simple; and
  - the palette mode is not used when the block classification of the block is simple vertical, simple horizontal, or simple.

11. The one or more computer-readable media of claim 10, wherein the determining the coding mode for the block includes evaluating costs of encoding the block in the multiple potential coding modes in the order, and wherein the evaluating the costs comprises, when a cost of a given coding mode of the multiple potential coding modes is less than a threshold:
- skipping evaluation of a subsequent potential coding mode, among the multiple potential coding modes, in the order; and
- selecting the given coding mode as the determined coding mode for the block.

12. The one or more computer-readable media of claim 11, wherein the evaluating the costs comprises, during evaluation of the intra-block copy mode, when the cost of encoding the block in the intra-block copy mode is less than the threshold for the intra-block copy mode:
- skipping evaluation of both the palette mode and the directional spatial prediction mode; and
- selecting the intra-block copy mode as the determined coding mode for the block.

13. The one or more computer-readable media of claim 11, wherein the evaluating the costs comprises, during evaluation of the palette mode, when the cost of encoding the block in the palette mode is less than the threshold for the palette mode:
- skipping evaluation of the directional spatial prediction mode; and
- selecting the palette mode as the determined coding mode for the block.

14. The one or more computer-readable media of claim 10, wherein the determining the coding mode for the block further includes, when evaluating the directional spatial prediction mode for the block:
- when the block classification of the block is simple vertical, skipping evaluation of a horizontal spatial prediction mode; and
- when the block classification of the block is simple horizontal, skipping evaluation of a vertical spatial prediction mode.

15. The one or more computer-readable media of claim 10, wherein the determining the coding mode for the block further includes, when evaluating the directional spatial prediction mode for the block:
- when the block classification of the block is simple, skipping evaluation of a chroma-from-luma mode.

16. The one or more computer-readable media of claim 10, wherein the video content is screen content.

17. The one or more computer-readable media of claim 10, wherein the frame of video content is encoded according to the AV1 video coding specification.

18. The one or more computer-readable media of claim 10, further comprising:
- outputting, as part of a bitstream, encoded data for the multiple blocks of the frame.

19. A computer system comprising one or more processors and memory, the computer system implementing a video encoder configured to perform operations to determine coding modes for video content, the operations comprising, for each block of multiple blocks of a frame of the video content:
- determining an order of multiple potential coding modes for the block, the multiple potential coding modes comprising intra-block copy mode, palette mode, and directional spatial prediction mode; and
- determining a coding mode for the block, the block having a block classification selected from multiple categories, the multiple categories comprising simple vertical, simple horizontal, simple, and non-simple, wherein the simple vertical category indicates, for each column of the block, all pixel values in that column are identical, wherein the simple horizontal category indicates, for each row of the block, all pixel values in that row are identical, wherein the simple category indicates all pixel values of the block are identical, and wherein:
  - the intra-block copy mode is not used when the block classification of the block is simple vertical, simple horizontal, or simple; and
  - the palette mode is not used when the block classification of the block is simple vertical, simple horizontal, or simple.

20. The computer system of claim 19, wherein the determining the coding mode for the block includes evaluating costs of encoding the block in the multiple potential coding modes in the order, and wherein the evaluating the costs comprises, when a cost of a given coding mode of the multiple potential coding modes is less than a threshold:
    skipping evaluation of a subsequent potential coding mode, among the multiple potential coding modes, in the order; and
    selecting the given coding mode as the determined coding mode for the block.

\* \* \* \* \*